United States Patent Office 3,658,830
Patented Apr. 25, 1972

3,658,830
5-(SUBSTITUTED MERCAPTO, SULFINYL, SULFONYL OR SULFAMOYL)
Kurt H. Pilgram and Richard D. Skiles, Modesto, Calif., assignors to Shell Oil Company, New York, N.Y.
No Drawing. Filed Jan. 16, 1970, Ser. No. 3,510
Int. Cl. C07d 91/32
U.S. Cl. 260—306.8 R
6 Claims

ABSTRACT OF THE DISCLOSURE

Certain novel thiazole derivatives substituted in the 2-position on the ring with urea moieties and in the 5-position on the ring with mercapto, sulfinyl, sulfonyl or sulfamoyl moieties are described as well as their preparation and use as herbicides.

BACKGROUND OF THE INVENTION

Field of the invention

This invention relates to a novel class of thiazolylureas substituted in the 5-position on the ring with mercapto, sulfinyl or sulfonyl moieties, which possess high herbicidal activity.

Description of the prior art

Belgian Pat. 679,138 discloses that certain substituted thiazolylureas and thiazolythioureas have herbicidal activity.

SUMMARY OF THE INVENTION

It now has been found that thiazolylureas substituted in the 5-position on the ring with mercapto, sulfinyl or sulfonyl moieties and optionally substituted in the 4-position with alkyl groups are outstanding herbicides, giving effective control of several economically important weed species.

The invention accordingly is a new class of thiazolylureas substituted in the 5-position on the ring with mercapto, sulfinyl or sulfonyl moieties and optionally substituted in the 4-position with alkyl groups, their use as herbicides and herbicidal formulations containing them.

DESCRIPTION OF THE PREFERRED EMBODIMENT

The novel compounds of this invention can be described by the general formula:

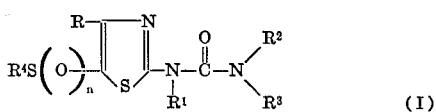
(I)

wherein R and $R^1$ each represent hydrogen or alkyl of up to 3 carbon atoms; $R^2$ is hydrogen, alkyl of up to 2 carbon atoms or $R^5C(O)$- wherein $R^5$ is alkyl of up to 3 carbon atoms, $R^3$ is alkyl of up to 2 carbon atoms or $R^5C(O)$-; $n$ is 0, 1 or 2; $R^4$ is alkyl of up to 4 carbon atoms or

wherein $R^6$ represents hydrogen, alkyl of up to 4 carbon atoms or cycloalkyl of up to 4 carbon atoms and $R^7$ is a lower alkali metal ion (Na, K or Li) or any of the moieties represented by $R^6$; $R^7$ may represent alkoxy of up to 3 carbon atoms or

wherein $R^9$ and $R^{10}$ are hydrogen or alkyl of up to 3 carbon atoms, if $R^6$ is hydrogen or alkyl; $R^7$ may represent $R^5C(O)$- wherein $R^5$ is as defined above, if $R^6$ is hydrogen and $R^2$ and $R^3$ are other than hydrogen; $R^6$ and $R^7$ together also, may form an alkylene group. Any of these alkyl groups can be of either branched-chain or straight-chain configuration.

Exemplary species of the class of the invention include:

1-methyl-3-(5-(methylsulfamoyl)-thiazol-2-yl)-urea;
1-methyl-3-(5-(methylhydrazinosulfonyl)-thiazol-2-yl)-urea;
1-methyl-3-(5-(methoxysulfamoyl)-thiazol-2-yl)-urea;
1-methyl-3-(5-(aziridinylsulfonyl)-thiazol-2-yl-)-urea;
1-methyl-3-(5-(methylhydrazinosulfonyl)-thiazol-2-yl)-urea;
1,1-dimethyl-3-(5-(methylsulfamoyl)-thiazol-2-yl)-urea;
1-methyl-3-(4-methyl-5-(methylsulfamoyl)-thiazol-2-yl)-urea;
1,1-dimethyl-3-(4-methyl-5-(methylsulfamoyl)-thiazol-2-yl)-urea;
sodium salt of 1-methyl-3-(5-(methylsulfamoyl)-thiazol-2-yl)-urea;
potassium salt of 1-methyl-3-(5-(methylsulfamoyl)-thiazol-2-yl)-urea;
sodium salt of 1,1-dimethyl-3-(5-(methylsulfamoyl)-thiazol-2-yl)-urea;
potassium salt of 1,1-dimethyl-3-(5-(methylsulfamoyl)-thiazol-2-yl)-urea;
sodium salt of 1,1-dimethyl-3-(4-methyl-5-(methylsulfamoyl)-thiazol-2-yl)-urea;
1,1-dimethyl-3-(5-(acetylmethylsulfamoyl)-thiazol-2-yl)-urea;
1,1-dimethyl-3-(4-methyl-5-(acetylmethylsulfamoyl)-thiazol-2-yl)-urea.

The highest herbicidal activity appears to be associated with the subclass wherein R and $R^1$ each is hydrogen or alkyl of up to 3 carbon atoms; $R^2$ is hydrogen or alkyl of up to 2 carbon atoms; $R^3$ is alkyl of up to 2 carbon atoms; $R^4$ is alkyl of up to 3 carbon atoms, or

wherein $R^6$ and $R^7$ represent alkyl of up to 4 carbon atoms; $n$ is 0, 1 or 2. Preferred species of this subclass include compounds wherein R and $R^1$ represent hydrogen or methyl, $R^2$ is hydrogen, $R^3$ is methyl, $R^4$ is methyl or ethyl and $n$ is 0, 1 or 2.

Specific examples of the preferred subclass include:

1-methyl-3-(4-methyl-5-(methylthio)-thiazol-2-yl)-urea;
1-methyl-3-(5-methylsulfonyl-thiazol-2-yl)-urea;
1,3-dimethyl-3-(4-methyl-5-(methylsulfonyl)-thiazol-2-yl)-urea;
1,3-dimethyl-3-(4-methyl-5-(methylthio)-thiazol-2-yl)-urea;
1-methyl-3-(4-methyl-5-methylsulfonyl)-thiazol-2-yl)-urea;
1-methyl-3-(5-ethylsulfonyl)-thiazol-2-yl)-urea;
1-methyl-3-(5-methylthio)-thiazol-2-yl)-urea;
1-methyl-3-(4-methyl-5-(ethylthio)-thiazol-2-yl)-urea;
1-methyl-3-(4-methyl-5-(ethylsulfonyl)-thiazol-2-yl)-urea;
1-methyl-3-(5-ethylthio)-thiazol-2-yl)-urea.

The compounds of the invention are solid at ambient temperature. They may be suitably formulated for use as herbicides, as wettable powders, dusts, granules, solutions, emulsifiable concentrates, emulsions and pastes. Wettable powders are usually compounded to contain 25, 50, 75 or up to 85% of toxicant and usually contain, in addition to solid carrier, 3–10% of a dispersing agent and, where necessary, 0–10% of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½ to 10% of toxicant. Granules are usually prepared to have a size between 10 and 100 BS mesh, and may be manufactured by agglomeration or impregnation techniques. Generally, granules will contain ½–25% of toxicant plus additives such as stabilizers, slow-release modifiers, binding agents, etc. Emulsifiable concentrates usually contain, in addition to the solvent, and, when necessary, co-solvent, 10–50% s./v. toxicant, 2–20% w./v. emulsifiers and 0–20% of appropriate additives such as stabilizers, penetrants and corrosion inhibitors. Pastes are compounded so as to obtain a stable flowable product and usually contain 10–60% toxicant, 2–20% of appropriate additives and, as carrier, water or an organic liquid in which the toxicant is substantially insoluble. Except where indicated otherwise, all percentages given in this paragraph are percentages by weight.

The herbicidal compounds of this invention may be prepared by the reaction of the substituted 2-aminothiazole of Formula II

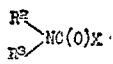

(II)

wherein R, $R^4$ and $n$ are as defined above with either an isocyanate or an acyl halide dependent on whether mono- or disubstitution is desired in the one position on the urea molecule. The reaction of compounds of Formula II with an isocyanate of the formula RNCO wherein R represents either $R^2$ or $R^3$ as defined above will yield the monosubstituted ureas encompassed by the invention. This reaction is suitably carried out in an anhydrous solvent such as either at a reaction temperature ranging from 25 to 100° C. with a reaction time of from 3 to 18 hours. The reaction of compounds of the Formula II with acyl halides of the formula

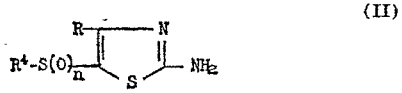

wherein $R^2$ and $R^3$ are as defined above and X is a halogen atom will yield the di-substituted ureas encompassed by the invention. This acylation reaction is suitably carried in an anhydrous solvent such as ether or tetrahydrofuran and in the presence of a base such as a tertiary amine. The reaction temperatures should range from 25 to 90° C. with reaction times of from 15 minutes to 3 hours.

The substituted aminothiazoles of Formula II can be prepared using as an initial reaction step, the general synthesis technique for thiazoles which was first described by Hantzsch (Ann. 249, 1 (1888)). This technique which involves the reaction of alpha-halocarbonyl compounds with thioureas or thioamides affords a convenient means of obtaining the desired unsubstituted or 4-alkyl substituted 2-aminothiazole intermediate.

The halogenation of the 2-aminothiazole intermediate introduces a halogen atom into the 5-position when it is unoccupied. This reaction can be successfully carried out in solvents such as water, aqueous acids, chloroform, carbon tetrachloride, benzene, carbon disulfide and glacial acetic acid using agents such as iodine, bromine, chlorine or sulfuryl chloride.

The reaction of the halogenated 2-aminothiazole intermediate with a sodium mercaptide will yield the desired 5-thio-2-aminothiazole by replacement of the halogen. This reaction is suitably carried out in refluxing methanol. If an alkylthio compound is desired, the appropriate sodium alkylmercaptide should be used.

This thio compound can be oxidized to the sulfinyl derivative by treatment with meta-chloroperbenzoic acid in chloroform solution. The sulfonyl derivative is prepared similarly using an excess of 33% hydrogen peroxide in glacial acetic acid or acetone solution.

The compounds of the invention, processes for their preparation and their herbicidal activity, are illustrated by the following examples, in which parts by weight (w) and parts by volume (v) bear the same relation as the kilogram to the liter and all temperatures are in degrees centigrade.

EXAMPLE I 1-methyl-3-(5-(ethylthio)-thiazol-2-yl)-urea

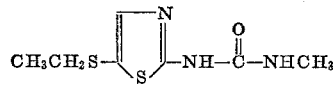

2-aminothiazole (150 w.) prepared using the technique described in the prior art was charged into a flask containing 48% hydrobromic acid (250 w.). This solution was heated to reflux (125°) and bromine (240 w.) was added dropwise. The addition was exothermic making external heat unnecessary. After completion of the addition the reaction mixture was cooled to 25°, diluted with 200 v. of acetone and cooled to 5°. The resulting precipitate was filtered, washed well with acetone and air dried. This solid (202 w.) was suspended in water (800 v.) and cooled to 5°. Sodium hydroxide (52 w.) in water (50 v.) containing sodium hydrosulfite (1.0 w.) was added dropwise. The mixture was stirred at 5° for 1 hour and filtered to yield 2-amino-5-bromothiazole (188 w.) melting at 104–105°.

A mixture of 2-amino-5-bromothiazole (45 w.), ether (200 v.) and ethyl mercaptan (15.5 w.) was treated with a solution of sodium methoxide (13.5 w.) in absolute methanol (50 v.) over a period of 15 minutes. The exothermic reaction raised the temperature to 40° and a fine solid precipitated. The reaction mixture was stirred at ambient temperature for one hour and washed with water (3 × 100 v.). The organic fraction was dried with MgSO₄ and concentrated by distillation in a vacuum to yield a red solid. This residue was extracted with boiling hexane and the solution was chilled to yield 2-amino-5(ethylthio)-thiazole (25 w.) melting at 73–75°. The structure was confirmed by infrared spectrum analysis.

A glass bomb was charged with 2-amino-5-(ethylthio)-thiazole (5 w.), anhydrous ether (100 v.) and methyl isocyanate (3 v.). The bomb was sealed and placed in a steam bath for 3 hours. Upon completion of the hold period, the reaction mixture was cooled to 5° and filtered. The filter cake was recrystallized from methanol to yield 1-methyl-3-(5-(ethylthio)-thiazol-2-yl)-urea (4.5 g.) melting at 193–195°. The structure was confirmed by elemental and infrared spectrum analyses.

*Analysis.*—Calculated (percent by wt.): N, 19.4; S, 29.5; C, 38.7; H, 5.0. Found (percent by wt.): N, 18.9; S, 29.5; C, 38.6; H, 5.1.

EXAMPLE II 1-methyl-3-(5-(ethylsulfonyl)-thiazol-2-yl)-urea

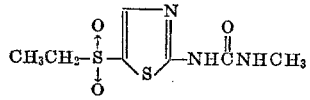

To a solution of 1-methyl-3-(5-(ethylthio)-thiazol-2-yl)-urea (1.5 w.) in acetic acid (50 v.), 30% hydrogen peroxide (20 v.) was added. This reaction mixture was heated to 75° then allowed to cool to ambient temperature. After standing at ambient temperature for 18 hours, the reaction mixture was poured into ice water and filtered to yield 1-methyl-3-(5-(ethylsulfonyl)-thiazol-2-yl)-urea (1.0 w.) melting at 213–215°. The structure was confirmed by elemental and infrared spectrum analyses.

*Analysis.*—Calculated (percent by wt.): N, 16.9; C, 33.8; H, 4.4. Found (percent by wt.): N, 16.6; C, 33.8; H, 4.7.

EXAMPLE III 1-methyl-3-(4-methyl-5-(methylthio)-thiazol-2-yl)-urea

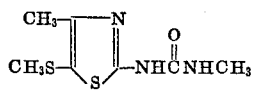

To a solution of 2-amino-4-methylthiazole (78 w.) prepared using the technique described in the prior art in concentrated hydrochloric acid (120 v.), bromine (38 v.) was added dropwise over a period of 30 minutes. The temperature of the reaction was controlled at or below 60° during the addition with an ice bath. A colorless solid precipitated during the addition. The reaction mixture was chilled to 4°, diluted with 125 v. of acetone and filtered. The filter cake was dissolved in a minimum amount of cold water and treated with aqueous ammonia until pH of 8 was obtained. The solid was filtered and dried to yield 2-amino-5-bromo-4-methyl-thiazole (55 w.) melting at 104–106°. The structure was confirmed by infrared spectrum analysis.

A solution of 2-amino-5-bromo-4-methylthiazole (45 w.) in absolute methanol (150 v.) was stirred during the addition of a solution of sodium methoxide (12.6 w.) and methyl mercaptan (11.2 w.) in absolute methanol (100 v.). After completion of the addition (15 minutes), the reaction was heated to reflux (64°) for 2.5 hours, and left at ambient temperature for 18 hours. The reaction mixture was then poured over ice and extracted with methylene chloride (3 × 150 v.). The combined extracts were dried with magnesium sulfate and concentrated by distillation in a vacuum to a red solid. The residue was recrystallized from hexane-benzene (3:2) to yield 2-amino-4-methyl-5-(methylthio)-thiazole (23 w.) melting at 77–80°. The structure was confirmed by elemental analysis.

A glass bomb was charged with 2-amino-4-methyl-5-(methylthio)-thiazole (5 w.), anhydrous ether (100 v.) and methyl isocyanate (3 v.). The bomb was sealed and left standing for 18 hours at ambient temperature. Upon completion of the hold period, the reaction mixture was cooled to 5° and filtered. The filter cake was recrystallized from methanol to yield 1-methyl-3-(4-methyl-5-(methylthio)-thiazol-2-yl)-urea (4 w.) melting at 194–196°. The structure was confirmed with elemental and infrared spectrum analyses.

*Analysis.*—Calculated (percent by wt.): N, 19.3; S, 29.5. Found (percent by wt.): N, 19.3; S, 29.2.

EXAMPLE IV 1-methyl-3-(4-methyl-5-(methylsulfonyl)-thiazol-2-yl)-urea

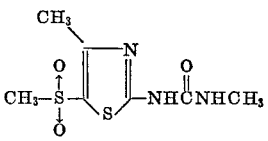

To a solution of 1-methyl-3-(4-methyl-5-(methylthio)-thiazol-2-yl)-urea (3.0 w.) in acetic acid (100 v.), 30% hydrogen peroxide (40 v.) was added. The reaction mixture was heated to 80° and then allowed to cool to ambient temperatures. After standing at ambient temperature for 18 hours, the reaction mixture was poured into ice water and filtered to yield 1 - methyl-3-(4-methyl-5-(methylsulfonyl)-thiazol-2-yl)-urea melting at 205°. The structure was confirmed by elemental and infrared spectrum analyses..

*Analysis.*—Calculated (percent by wt.): N, 16.9; S, 25.7. Found (percent by wt.): N, 16.7; S, 25.6.

EXAMPLE V

Following procedures similar to those given in previous examples, the following other species of the compounds of the invention were prepared (symbols refer to Formula III).

TABLE I

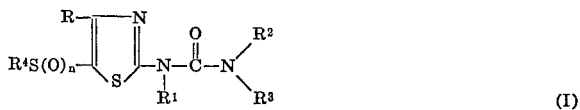

(I)

| Compound | n | R | R¹ | R² | R³ | R⁴ | Melting point, °C. | Calculated N | Calculated S | Calculated C | Found N | Found S | Found C |
|---|---|---|---|---|---|---|---|---|---|---|---|---|---|
| 5 | 0 | H | H | H | CH₃ | CH₃ | 208–210 | 20.7 | 31.5 | | 20.5 | 32.2 | |
| 6 | 2 | H | H | H | CH₃ | CH₃ | 258 | 17.9 | 27.2 | | 18.1 | 27.0 | |
| 7 | 0 | CH₃ | H | H | CH₃ | CH₂CH₃ | 188–19 | 18.2 | | 41.5 | 18.3 | | 41.8 |
| 8 | 2 | CH₃ | H | H | CH₃ | CH₂CH₃ | 217–218 | 16.0 | | 36.5 | 16.5 | | 37.3 |
| 9 | 0 | CH₃ | CH₃ | H | CH₃ | CH₃ | 87–90 | 18.2 | 27.7 | | 18.2 | 27.8 | |
| 10 | 2 | CH₃ | CH₃ | H | CH₃ | CH₃ | 176–178 | 16.0 | 24.3 | | 16.0 | 23.9 | |
| 11 | 2 | H | H | H | CH₃ | (CH₃)₂N | 266–269 | 16.9 | 25.7 | | 16.7 | 24.9 | |

EXAMPLE VI

Pre-emergence herbicidal activity of the typical compounds of the invention was evaluated by planting weed seeds in soil held in large test tubes, the soil having been treated with the test compound at the rate of 1 and 10 milligrams of test compound per tube, respectively. Seeds of watergrass (*Echinochloa crusgalli*) and cress (*Lepidium sativum*) were germinated in treated soil under controlled conditions of temperature and light for 12 to 13 days prior to evaluation of the effectiveness of the treatments. At that time, the germination was noted and the treatments were rate on a 0 (no effect) to 9 (all dead) scale. The results are summarized in Table II.

Post-emergence herbicidal activity was evaluated by spraying dilute suspensions of the test compound in a 1:1 mixture of acetone and water with 0.5% wetting agent on crabgrass (*Digitaria sanguinalis*) and pigweed plants (*Amaranthus sp*) grown under controlled conditions at the rates of 1 and 10 pounds test compound per acre. After the plants were held for 10 to 11 days, they were rated for treatment effect on a 0 (no effect) to 9 (total plant kill) scale. The results of these tests are shown in Table II.

TABLE II

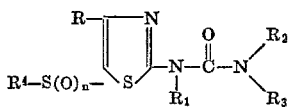

| n | R | R¹ | R² | R³ | R⁴ | Watergrass 1 | 10 | Cress 1 | 10 | Crabgrass 1 | 10 | Pigweed 1 | 10 |
|---|---|---|---|---|---|---|---|---|---|---|---|---|---|
| 2 | H | H | H | CH₃ | CH₃ | 8 | 8 | 9 | 9 | 9 | 9 | 9 | 9 |
| 0 | CH₃ | H | H | CH₃ | CH₃ | 0 | 2 | 0 | 8 | 5 | 9 | 6 | 9 |
| 2 | CH₃ | CH₃ | H | CH₃ | CH₃ | 8 | 8 | 9 | 9 | 7 | 9 | 9 | 9 |
| 0 | CH₃ | CH₃ | H | CH₃ | CH₃ | 6 | 9 | 9 | 9 | 6 | 9 | 8 | 9 |
| 2 | CH₃ | H | H | CH₃ | CH₃ | 8 | 8 | 9 | 9 | 7 | 9 | 8 | 9 |
| 2 | H | H | H | CH₃ | CH₃ | 7 | 8 | 9 | 9 | 8 | 9 | 9 | 9 |
| 0 | H | H | H | CH₃ | CH₃ | 1 | 8 | 6 | 9 | 4 | 7 | 4 | 9 |
| 0 | H | H | H | CH₃ | CH₃CH₂ | 0 | 8 | 8 | 9 | 7 | 9 | 7 | 9 |
| 2 | CH₃ | H | H | CH₃ | CH₃CH₂ | 8 | 9 | 9 | 9 | 8 | 9 | 9 | 9 |
| 0 | CH₃ | H | H | CH₃ | CH₃CH₂ | 0 | 3 | 6 | 8 | 4 | 6 | 0 | 9 |
| 2 | H | H | H | CH₃ | (CH₃)₂N | 7 | 8 | 8 | 9 | 2 | 6 | 1 | 9 |

We claim as our invention:

1. Novel compounds defined by the formula

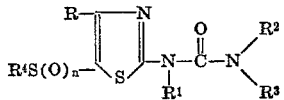

wherein R and R¹ each represents hydrogen or alkyl of up to 3 carbon atoms; R² is hydrogen, alkyl of up to 2 carbon atoms or R⁵C(O)– wherein R⁵ is alkyl of up to 3 carbon atoms, R³ is alkyl of up to 2 carbon atoms or R⁵C(O)–; n is 0, 1 or 2; R⁴ is alkyl of up to 4 carbon atoms or

wherein R⁶ represents hydrogen, alkyl of up to 4 carbon atoms or cycloalkyl of up to 4 carbon atoms, and R⁷ is a lower alkali metal ion (Na, K or Li) or any of the moieties represented by R⁶; R⁷ may represent alkoxy of up to 3 carbon atoms or

wherein R⁹ and R¹⁰ are hydrogen or alkyl of up to 3 carbon atoms, if R⁶ is hydrogen or alkyl; R⁷ may represent R⁵C(O)– wherein R⁵ is as defined above, if R⁶ is hydrogen and R² is hydrogen and R² and R³ are other than hydrogen; R⁶ and R⁷ together also, may form an alkylene group of 2 carbon atoms.

2. Compounds according to claim 1, wherein R and R¹ represent hydrogen or alkyl of up to 3 carbon atoms; R² and R³ are hydrogen or alkyl of up to 2 carbon atoms with the proviso that both R² and R³ are not hydrogen; R⁴ is alkyl of up to 3 carbon atoms, or

wherein R⁶ and R⁷ represent alkyl of up to 4 carbon atoms; n is 0, 1 or 2.

3. Compounds according to claim 2, wherein R and R¹ represent hydrogen or methyl, R² is hydrogen, R³ is methyl, R⁴ is methyl or ethyl and n is 0, 1 or 2.

4. Compounds according to claim 3, wherein R and R¹ represent methyl, R² is hydrogen, R³ is methyl, R⁴ is methyl and n is 0 or 2.

5. The compound according to claim 4, wherein n is 0.

6. The compound according to claim 4, wherein n is 2.

References Cited

UNITED STATES PATENTS 3,468,899   9/1969   Barber et al. _____ 260—306.8 R

ALEX MAZEL, Primary Examiner

R. J. GALLAGHER, Assistant Examiner

U.S. Cl. X.R.

71—90